Nov. 12, 1963 W. A. BISHOP 3,110,173
MOISTURE CONTENT MONITORING
Filed Oct. 1, 1959
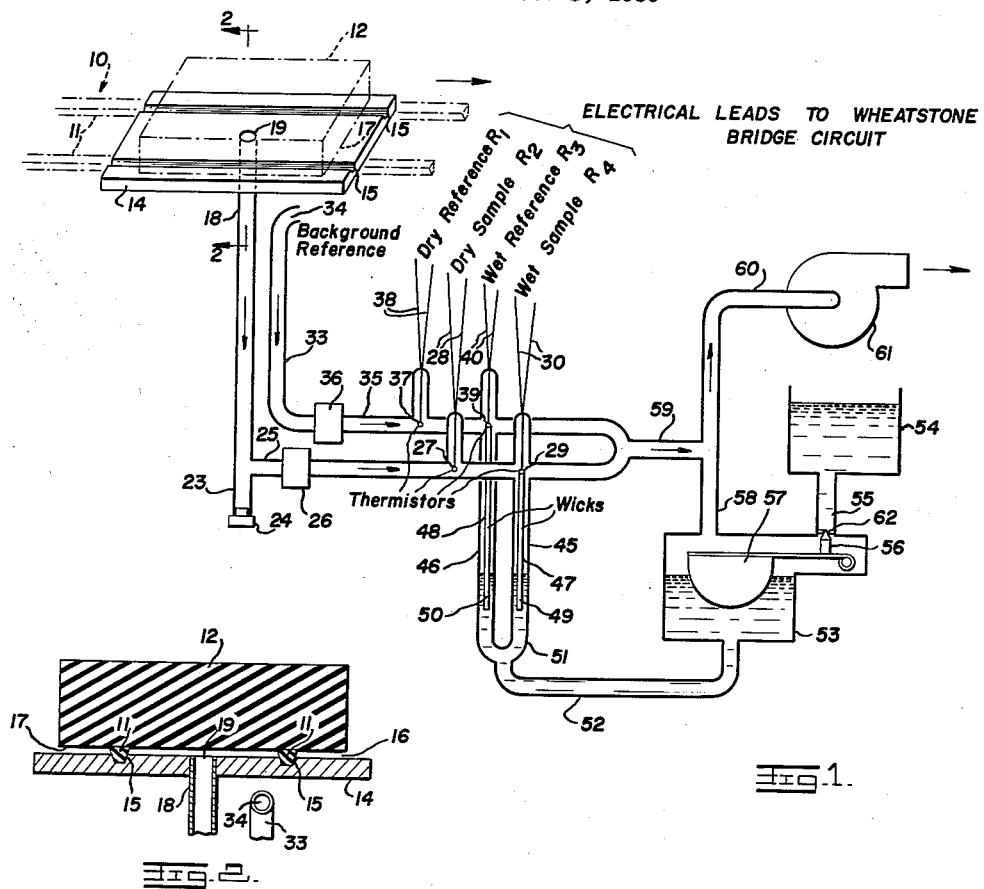
Fig.1.
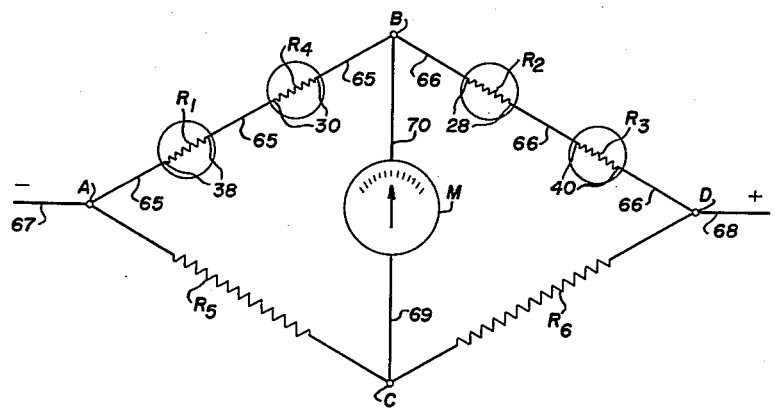
Fig.2.
Fig.3.
INVENTOR.
WILLIAM A. BISHOP
BY Shanley & O'Neil
ATTORNEYS United States Patent Office 3,110,173
Patented Nov. 12, 1963

3,110,173
MOISTURE CONTENT MONITORING
William A. Bishop, Baton Rouge, La., assignor to Copolymer Rubber & Chemical Corporation, a corporation of Louisiana
Filed Oct. 1, 1959, Ser. No. 843,888
10 Claims. (Cl. 73—77)

This invention relates to a novel method and improved apparatus for comparing vapor contents in reference and sample gases and, in one of its more specific aspects, to a novel method and improved apparatus for monitoring the moisture content of materials.

This application is a continuation-in-part of application Serial No. 826,865, filed July 13, 1959, now abandoned, by William A. Bishop for "Apparaus and Method."

The apparatus and method of the present invention will be illustrated and described hereinafter with specific reference to the determination of moisture in freshly formed bales of synthetic rubbery polymer. However, it will be recognized by those skilled in the art that the apparatus and method of the present invention are equally useful in numerous other applications including the monitoring of drying processes in general which depend upon the evaporation of a liquid from a material. The invention is especially useful for monitoring the moisture content of solid materials such as, for example, tire cord after it has been dipped in latex and withdrawn from a dryer, paper at the dry end of a papermaking machine, paper and fabric in various coating processes such as when aqueous dispersions of coating material are applied thereto and the water content removed in a subsequent drying operation, or compounded rubbery polymer stock as it is removed from mills and/or calenders in an automobile tire plant.

The synthetic rubber industry has long experienced difficulties in attempts to monitor the moisture content of dried polymer. For example, washed rubber crumb is passed continuously through dryers and dried to a low moisture content such as 1% or lower and preferably below 0.20%. In instances where it is desired to produce a high-quality, low-moisture product using a minimum drying time, it is necessary to provide some means for determining the moisture content of each individual bale of synthetic rubber after it is baled at the exit end of the dryers and is being passed to a wrapping station and/or storage. Inasmuch as newly formed bales are placed on a continuously moving conveyor in modern plants, it is necessary that a suitable moisture detecting method be rapid as well as accurate and reliable.

The synthetic rubber industry has long sought a satisfactory apparatus and method for monitoring moisture content in bales of polymer. However, heretofore it was not practical due to the limitations of prior art apparatus and methods to determine the internal moisture content of a solid, compacted, highly water-impervious bale of polymer by withdrawing an air sample from the immediate vincinity of the bale surface and determining its moisture content. In fact, the art has always considered such a method to be unsatisfactory, not only due to the physical and chemical characteristics of a rubbery polymer bale mentioned above, but also since the moisture content of an acceptable rubbery polymer is extremely low and any change in the moisture content of a sample air stream withdrawn from the immediate vicinity of the bale would be too low when compared with the background humidity to allow accurate results in the short period of time available for monitoring.

The present invention provides an apparatus and method which, while not limited thereto, is especially useful for monitoring low moisture contents in materials. In accordance with one important embodiment of the present invention, a differential electropsychrometer is provided for sensing the difference in relative humidity of two gaseous streams, with one of the gaseous streams normally being an ambient air stream withdrawn from the general area of the material being monitored and the second or sample air stream being withdrawn from the immediate vicinity of the material to be monitored. Since the relative humidity change in the sample air stream normally is very low, such as 1–3% above the relative humidity of the reference or ambient air stream, it is essential to provide apparatus for constantly compensating for both ambient temperature and humidity changes as there are wide swings in daily ambient relative humidity and temperature. The present invention overcomes this difficulty by providing an electropsychrometer which automatically compensates for changes in ambient temperature and relative humidity, while measuring the differential relative humidity of the two gaseous streams without indicating the relative humdity directly of either the ambient air stream or the sample air stream. A signal discrimination is thereby effected which permits the generated signal to be accurately employed to operate alarm and/or control devices without requiring complicated apparatus, a plurality of different devices, or amplifying the electrical signal. In addition, extremely rapid and accurate results may be obtained.

The invention employs a plurality of sensing elements electrically responsive to the wet and dry bulb temperatures of gases to be compared and ingeniously combines them in a single balanceable network so that the electrical response indicative of any difference between the relative humidity of the gases varies over a very limited range even though the relative humidity of the gases being compared may vary over a very wide range. For example, when the invention is employed in monitoring synthetic rubber for moisture, the relative humidity of the ambient atmosphere (the reference gas) may vary during the day 30–40% or more and yet the differential relative humidity of interest remains in the vicinity of about 1–3%. Conventionally, continuous measurement under such conditions would require instruments which sacrifice precision in order to effect measurement over the full range of relative humidity variations of the gases being compared, or employ multiple measuring instruments. According to the invention, a single precisional instrument may be employed. The four variables measured, the wet and dry bulb temperatures of the sample and reference gases, are connected into two ratio arms of a balanceable network so that the ratio being compared remains within the limited differential of interest in spite of wide variations in the actual relative humidities of the gases. Specifically, one ratio arm may include the wet bulb temperature measurement of the sample gas and the dry bulb temperature measurement of the reference gas, while the adjacent ratio arm may include the dry bulb temperature of the sample gas and the wet bulb temperature measurement of the reference gas. In this way wide temperature differentials between the gases are offset in the adjacent ratio arms of the balanceable network allowing more precisional measurements. And additional instruments are not necessary for taking into consideration changes in the temperature or relative humidity of the reference gas. Continuous measurement is effected with a single precisional instrument.

It is an object of the invention to provide improved measuring apparatus which maintains a high degree of accuracy under varying operational conditions.

It is a further object of the invention to provide improved electrical apparatus for making precisional measurements of a dependent variable irrespective of wide variations of a plurality of independent variables.

It is still a further object of the invention to provide improved apparatus for the comparison of gases wherein the measuring apparatus is responsive to a number of conditions varying over wide ranges and a precisional comparison is achieved independent of the degree of variation.

It is still a further object of the invention to provide improved electrical structure responsive to wide range variations and yet permitting the use of precisional narrow range electrical measuring apparatus.

It is still a further object of the present invention to provide a novel method and improved apparatus for comparing the content of a vapor in reference and sample gases.

It is still a further object of the present invention to provide a novel method and improved apparatus for monitoring the moisture content of materials.

It is still a further object of the present invention to provide a novel method and improved apparatus which is especially well adapted for monitoring the moisture content of rubbery polymers.

It is still a further object of the present invention to provide an improved differential electro-psychrometer which automatically compensates for ambient temperature and humidity changes and which may be used in monitoring the moisture content of materials having a low moisture content rapidly and with high accuracy.

Still other objects and advantages of the present invention will be apparent to those skilled in the art upon reference to the following detailed description and the drawing, wherein:

FIGURE 1 diagrammatically illustrates one suitable arrangement of apparatus for practicing the present invention;

FIGURE 2 is a cross-sectional view taken along the line 2—2 of FIGURE 1 illustrating the manner in which an air sample may be obtained when monitoring bales of rubbery polymer for moisture; and FIGURE 3 diagrammatically illustrates the manner in which wet and dry bulb thermistors arranged in the ambient and sample air streams of FIGURE 1 are electrically connected in a Wheatstone bridge circuit so as to provide an electrical signal across the bridge which varies in proportion to the difference between the relative humidity of the ambient air stream and the sample air stream.

Referring now to FIGURES 1 and 2 of the drawings, and conveyor belt assembly 10, driven by conventional means not illustrated in the interest of clarity and including V-belts 11, is shown transporting in the direction of the arrow a material to be monitored for moisture content such as bale 12 of synthetic rubber. The V-belts 11 and bale 12 are shown in dotted lines in FIGURE 1 and in solid lines in FIGURE 2 for the purpose of clarity. The V-belts 11 are shown passing over support 14 and, preferably, the support 14 is provided with longitudinally extending recesses 15 forming seats for V-belts 11. As best seen in FIGURE 2, the V-belts 11 are of a thickness allowing a small space 16 to be formed between support 14 and the undersurface 17 of bale 12, with the V-belts 11 being in sealing engagement with the undersurface 17 and recesses 15. The support 14 is provided with a sample air stream conduit 18 extending therethrough having an opening 19 centrally located between V-belts 11.

Referring again to FIGURE 1, the conduit 18 at its lower end is provided with a crumb trap 23 having a removable plug 24. A conduit 25 is in communication with conduit 18 at a point above the crumb trap and provided with filter 26. A dry sample thermistor $R_2$ provided with leads 28 and a wet sample thermistor $R_4$ placed downstream therefrom and provided with leads 30 are centrally arranged in conduit 25 so as to be intimately contacted by the sample air stream flowing therethrough in the direction of the arrow. As best seen in FIGURE 2, a reference air stream conduit 33 having an opening 34 is arranged so as to be directly beneath the support 14 for the purpose of obtaining a representative sample of atmospheric air from the general vicinity of bale 12. The horizontal portion 35 of conduit 33 is provided with filter 36, dry reference thermistor $R_1$ having leads 38 and wet reference thermistor $R_3$ placed downstream therefrom and provided with leads 40. The thermistors $R_1$ and $R_3$ are centrally arranged in conduit 35 so as to be intimately contacted by the reference or ambient air stream flowing therethrough in the direction of the arrow. Conduits 45 and 46 are in communication at their upper ends with conduits 25 and 35, respectively, at points directly beneath thermistors $R_4$ and $R_3$ and extend downward therefrom a distance sufficient to receive wicks 47 and 48, respectively. The wicks 47 and 48 have lower ends 49 and 50, respectively, immersed in water supply 51 and extend upward to thermistors $R_4$ and $R_3$, respectively, thereby assuring by capillary action that the thermistors $R_4$ and $R_3$ are wet at all times. The conduits 45 and 46 terminate at their lower ends in water supply conduit 52 leading from the bottom of vessel 53. Water is supplied to vessel 53 from water supply vessel 54 via conduit 55 at a rate controlled by member 56 on floater valve 75. The top of vessel 53 is provided with conduits 58 which is in communication with conduit 60 and the conduit 59 that is formed upon terminating conduits 25 and 35. This arrangement assures a similar pressure within the air space of vessel 53 and the various conduits of the system and thus the water level in vessel 53 and conduits 45 and 46 will remain the same. A suction is maintained on conduit 60 by means of blower 61 and this assures that a constant supply of both sample air and reference air is pulled through conduits 18, 25, 33 and 35 at approximately the same rate.

FIGURE 3 illustrates a balanceable network including the thermistors $R_1$, $R_2$, $R_3$ and $R_4$ of FIGURE 1. For example, the arm AB includes dry reference thermistor $R_1$ and wet sample thermistor $R_4$ electrically connected in series by means of leads 38 and 30, respectively, to connectors 65. Similarly, dry sample thermistor $R_2$ and wet reference thermistor $R_3$ are electrically connected in series in arm BD by means of leads 28 and 40, respectively, to connectors 66. Arm AC includes reference resistor $R_5$ and arm CD includes reference resistor $R_6$. The electrical connections 67 and 68 may be connected to a constant voltage direct current source; a meter or detector M is electrically connected across the bridge between points B and C by means of electrical connections 69 and 70 for the purpose of measuring the potential difference between points B and C.

In operating the above-described apparatus for monitoring the moisture content of the bale of synthetic rubber 12, the bale 12 is placed upon V-belts 11 and moved in the direction of the arrow. As the bale 12 passes over opening 19 in conduit 18, a sample of air is withdrawn from space 16 under surface 17 of bale 12. The bale 12 has been freshly baled from warm dried polymer crumb having an undetermined moisture content and the surface of bale 12 has a moisture content which evaporates to the surrounding atmosphere. The temperature of the bale may be about 120–190° F. and preferably about 150–170° F. Since the undersurface 17 of bale 12 is likewise evaporating moisture to the immediately surrounding atmosphere, the sample of air withdrawn via conduit 18 from space 16 will have a higher relative humidity and may have a different temperature than the ambient atmosphere. For best results in high speed operations the temperature of consecutive bales should be approximately the same.

A suction is maintained on conduit 60 by means of blower 61 thereby assuring withdrawal of a sample air stream from the space 16 via conduits 18 and 25 at a suitable flow rate such as about ½–25 feet per second or higher and passage of the same over dry sample thermistor $R_2$ and then wet sample thermistor $R_4$. Simultaneously, reference or ambient stream of air is withdrawn from under support 14 at opening 34 and passed at an approximately equal flow rate via conduits 33 and 35 over dry reference thermistor $R_1$ and wet reference thermistor $R_3$, the reference air stream normally having a lower relative humidity than the sample air stream. Both streams of air are then withdrawn via conduits 59 and 60 and discharged by blower 61.

The wicks 47 and 48 in conduits 45 and 46 are immersed in water supply 51 and assure a constant supply of water to thermistors $R_4$ and $R_3$ at points 29 and 39, respectively, so as to provide "wet bulb" readings. The proper water level is maintained within conduits 45 and 46 by providing a similar water level in vessel 53 and supplying water therefrom via conduit 52. The float 57 controls the flow of water from water supply vessel 54 via conduit 55 into vessel 53 in the usual manner. For example, as water is used, the float 57 gradually passes downward with the water level in vessel 53 thereby lowering element 56 and eventually allowing water to pass through member 62. As the water level rises in vessel 53 due to addition of water thereto, the float 57 likewise rises and forces member 56 back into sealing relationship with member 62 thereby preventing flow of water until such time as the water level again recedes.

Upon withdrawing a sample air stream via conduit 18, large particles of rubber removed from bale 12 fall downward into trap 23 and are withdrawn as necessary by moving plug 24. Fine rubber particles, talc, dust, etc. are removed from the sample air stream and reference air stream by means of glass wool or other suitable filters 26 and 36, respectively, before passing over the thermistors.

The temperature of dry reference thermistor $R_1$ will vary depending upon the actual temperature of the air stream flowing within conduit 35, while the temperature of wet reference thermistor $R_3$ will differ from the temperature of the thermistor $R_1$ in an amount depending upon the rate of evaporation of water from wick 48 in the vicinity of point 39, which in turn will vary depending upon the relative humidity of the reference air stream. At low relative humidity, the water evaporates from wick 48 more rapidly and thus cools thermistor $R_3$ to a lower temperature thereby increasing the temperature differential response of thermistors $R_1$ and $R_3$. Similarly, thermistor $R_2$ measures the actual temperature of the sample air stream flowing in conduit 25, while wet sample thermistor $R_4$ is at a lower temperature depending upon the relative humidity of the sample air stream, assuming the relative humidity is not 100%. Likewise, the temperature differential between thermistors $R_2$ and $R_4$ will vary depending upon the rate of evaporation of water from wick 47 in the vicinity of point 29, which likewise will vary with the relative humidity as described above.

Referring now to FIGURE 3, the resistance of arm AB will vary depending upon the response of thermistors $R_1$ and $R_4$. In turn, the response of thermistor $R_1$ will vary depending upon the actual temperature of the reference air stream flowing in conduit 35, i.e., upon the temperature of the ambient atmosphere in instances where a background reference sample is being withdrawn from beneath support 14. The response of thermistor $R_4$ will be dependent upon the temperature of the sample air stream flowing in conduit 25 and the rate of evaporation of water from wick 47 at point 29, which in turn is dependent upon the relative humidity of the sample air stream flowing in conduit 25. Similarly, the resistance of arm BD will vary depending upon the response of thermistors $R_2$ and $R_3$. The response of $R_2$ will vary depending upon the actual temperature of the sample air stream flowing in conduit 25, while the response of $R_3$ will vary depending upon the actual temperature of the reference air stream flowing in conduit 35 and its relative humidity which determines the evaporation rate of water from wick 48 in the vicinity of point 39. In this way, the temperature of each gas is constantly considered and temperature differences between the gases do effect the differential relative humidity output signal. The resistance of arms AC and CD may be fixed and predetermined by the values of $R_5$ and $R_6$. Preferably, $R_5$ and $R_6$ are of equal value.

Normally, when determining the moisture content of bale 12 and withdrawing a background sample of air from immediately beneath support 14, the temperature of the reference air stream flowing in conduit 35 will be about the same as the temperature of the sample air stream flowing within conduit 25. However, since the sample air stream withdrawn via conduit 18 normally contains more moisture due to evaporation of water from the undersurface 17 of bale 12, it will have a higher relative humidity and result in less evaporation from wick 47 at point 29 and thus cause a higher temperature response for wet sample thermistor $R_4$ than for wet reference thermistor $R_3$. Therefore, the net result is an unbalance in the bridge and a potential difference will exist across the bridge dependent upon an increase or decrease in the differences in the relative humidities of the air streams. Therefore, the signal across the bridge varies directly in response to the rate of evaporation of water from the undersurface 17 of bale 12, which in turn is dependent upon the original moisture content of the crumb rubber. Thus, by properly calibrating meter M it is possible to determine the moisture content of bale 12.

The arrangement of thermistors $R_1$, $R_2$, $R_3$ and $R_4$ and the fixed resistors $R_5$ and $R_6$ is such that a differential electrosychrometer is provided which automatically is compensated for ambient temperature and relative humidity changes. Including responses from both gases in each ratio arm limits the variation of the ratio between the two adjacent ratio arms. This is of utmost importance when it is recognized that the differential relative humidity between the two air streams is often as low as 1–3% and the temperature and relative humidity of the ambient atmosphere varies as much as 30–40% or more during the day. The above allows a much more sensitive meter or detector of the potential difference between points B and C to be used than would be possible with apparatus which measured the widely varying relative humidity of the air streams and determined the differential humidity directly from such large range instruments.

The theory and operation of thermistors is described in various well known publications such as the article entitled "Properties and Uses of Thermistors—Thermally Sensitive Resistors," by J. A. Becker, C. B. Green and G. L. Pearson, published in A.I.E.E. Transactions, volume 65, 1946, November section, pages 711–25. While thermistors may be in the form of rods, washers, disks, etc., it is preferred that they be in the form of small beads for use in the present invention so as to reduce the mass of the thermistor to as low a value as possible and thereby increase its sensitivity toward temperature change. A suitable satisfactory thermistor may comprise a bead made by forming small ellipsoids of mixed metal oxide thermistor material on two fine wires stretched tight and parallel about 0.010 inch apart. The metal oxide material is sintered at high temperature and the leads become imbedded tightly in the resulting beads thereby making good electrical contact. Thereafter, the beads may be coated with a thin layer of glass and the leads electrically connected in a Wheatstone bridge as illustrated in the drawings with the small bead of thermistor material being placed in the air streams at 27, 29, 37 and 39 as shown in the drawings.

While thermistors characterized by high temperature sensitivity and rapid change in resistance are preferred in practicing the present invention, still other thermally sensitive elements may be used in some instances. Examples of thermally sensitive elements which may be used in such instances include thermocouples, thermometers, etc. However, it is understood that such thermally sensitive elements are not generally suitable in practicing the present invention for the monitoring of bales of rubber, such as herein specifically disclosed, or in measuring the moisture content of other materials requiring a rapid determination of moisture content over a very short period of time such as 1–4 seconds and at a low differential relative humidity such as 1–3%.

A Wheatstone bridge electrical circuit has been disclosed and specifically described herein. However, it is expressly understood that any balanceable network may be used and the invention is not limited to a direct current source of voltage. In the balanceable network, the sensing means is not limited to the current modifying type but may also be of the current generating type, such as thermoelectric devices, without departing from the spirit of the invention. Additionally, while the invention has been illustrated employing a balanceable network including sensing elements in two arms and fixed impedances in the remaining arms, it is to be understood that other than fixed impedances may be employed without departing from the scope of the invention. For example, adjustable impedances or condition responsive devices which establish the desired ratio for the measured or controlled operation, may be employed.

The present invention is unique in its ability to monitor the moisture content of freshly baled synthetic rubber with the required high degree of accuracy and in a minimum period of time. For example, when following convention practice, GRS rubber crumb from prior art dryers is baled and then the bales immediately placed on V-belts 11 of conveyor belt assembly 10. The freshly formed bale of rubber has a layer of moisture thereon which has been discovered to be directly related to the moisture content of the interior of the bale. Since this layer of moisture evaporates relatively rapidly, it is desirable to pass bale 12 over support 14 as soon as possible for best results. Usually, the moisture content of the bale should be monitored less than 10 minutes from the time of baling, and preferably within 3 minutes. Better results are obtained within the shortest period possible subsequent to baling. It is unusual and unexpected to find that the moisture content of the interior of the compacted, water impervious bale may be accurately determined by monitoring an air sample withdrawn from adjacent the surface of the freshly formed bale. Furthermore, it is even more unusual and unexpected to discover that extremely low moisture contents may be monitored rapidly and with great accuracy when the normal variations in ambient temperature and humidity are considered. Usually a period of 1–4 seconds is sufficient to determine the moisture content of the bale.

It has been further discovered that when chunks of wet rubber are present in the dried polymer crumb feed to the baling machine the moisture content tends to be distributed throughout the bale during the baling operation. This is true even when the wet rubber is located in the center of the bale. Thus, the present invention, unexpectedly, allows detection of wet rubber concentrations located on the bale surface or within the interior of the bale.

The foregoing detailed description and the following specific examples are for purposes of illustration only and are not intended as limiting to the spirit or scope of the appended claims.

EXAMPLE

This example illustrates the use of the differential electropsychrometer illustrated in the drawings.

The following components are used in the Wheatstone bridge circuit illustrated in FIGURE 3 of the drawings:

(1) The leads 67 and 68 are connected to a constant direct current voltage source of 1.75 volts.

(2) $R_1$, $R_2$, $R_3$ and $R_4$ are thermistors having a resistance at 77° F. of 2000 ohms and a temperature coefficient of resistance of −36.1 ohms/° F. over the limited temperature range involved here. Thus, $$R_t = 2000 + (T - 77° \text{ F.})(-36.1)$$

(3) $R_5$ and $R_6$ are fixed reference resistors of 470 ohms each.

(4) M is a meter or detector for measuring the potential difference between points B and C and may be a recording potentiometer having a full scale sensitivity of 0.010 volt and a limit alarm switch set at 0.003 volt.

Since the reference resistors $R_5$ and $R_6$ are equal and the voltage ($V_s$) applied to the bridge is constant, the voltage between points B and C ($V_m$) is given by the following expression:

$$V_m = V_s \left( 0.5 - \frac{R_1 + R_4}{R_1 + R_2 + R_3 + R_4} \right)$$

*Compensation for Ambient Temperature Change*

The ability of the differential electropsychrometer of the invention to automatically compensate for ambient temperature changes is illustrated by the following:

CONDITIONS (1) The temperature changes to 80° F. from 78° F.
(2) The relative humidity remains constant at 87%.
(3) The voltage $V_s$ is 1.75 volts.
(4) The bale 12 is not over the opening 19. Thus, the atmosphere pulled through each of the conduits 25 and 35 is the same and the humidity is constant.

At 80° F., the resistance of $R_1$ and $R_2$ will be:

$R_1 = R_2 = 2000 + (80° \text{ F.} - 77° \text{ F.})$
$(-36.1) R_1 = R_2 = 1891.7$ ohms Due to the evaporation of moisture from the wicks of thermistors $R_3$ and $R_4$, their temperature is 77° F. and thus their resistances are as follows:

$R_3 = R_4 = 2000 + (77° \text{ F.} - 77° \text{ F.})(-36.1) = 2000$ ohms

Substitution of this value into the above signal expression yields:

$$V_m = 1.75 \left( .5 - \frac{1891.7 + 2000}{1891.7 + 1891.7 + 2000 + 2000} \right)$$

$V_m = 1.75 (.5 - .5) = 0$.

If the ambient temperature changes to 78° F. from 80° F. and the relative humidity remains constant at 87%, the thermistor resistances are as follows:

|  | Temperature, ° F. | Resistance (Ohms) |
|---|---|---|
| $R_1$ | 78 | 1,963.9 |
| $R_2$ | 78 | 1,963.9 |
| $R_3$ | 75 | 2,072.2 |
| $R_4$ | 75 | 2,072.2 |

The signal remains:

$$V_m = 1.75 \left( .5 - \frac{1963.9 + 2072.2}{1963.9 + 1963.9 + 2000 + 2000} \right) = 0$$

*Compensation for Ambient Humidity Change*

CONDITIONS (1) The temperature remains constant at 80° F.
(2) The relative humidity changes from 87% to 79%.
(3) The voltage $V_s$ is 1.75 volts.
(4) The bale is not over the opening 19 and the air sample pulled through each of the conduits 25 and 35 is the same.

The voltage $V_m$ was shown to be zero for the original conditions of 80° F. and 87% relative humidity.

The wet thermistor temperature at 80° F. and 79% relative humidity is 75° F., therefore:

$R_1 = 1891.7$
$R_2 = 1891.7$
$R_3 = 2072.2$
$R_4 = 2072.2$ and:

$$V_m = 1.75\left(.5 - \frac{1891.7 + 2072.2}{1891.7 + 1891.7 + 2072.2 + 2072.2}\right) = 0$$

From the above, it is apparent that the differential electropsychrometer of the present invention automatically compensates for ambient temperature or humidity changes. Further, there is similar compensation when both variables occur simultaneously. In the absence of a differential relative humidity in the two gaseous streams being compared, the electrical signal $V_m$ is zero.

Detection of Differential Humidity

CONDITIONS (1) The temperature remains constant at 80° F.
(2) The relative humidity of the ambient air stream withdrawn via conduit 33 is 79%.
(3) The voltage $V_s$ is 1.75 volts.
(4) The relative humidity of the air sample withdrawn via conduit 18 is higher than 79%, as follows:

(a) A newly formed bale of GRS black master-batch containing 0.15% moisture was passed over the opening 19 for 2½ seconds within ½–1½ minutes after leaving the baling machine. The evaporation of moisture from the undersurface 17 of the bale changed the humidity of the sample air stream flowing in conduit 18 by 2%, i.e., from 79% to 81%.

(b) A bale identical to that described in paragraph (a) above with the exception of the bale containing 0.6% moisture was passed over opening 19 under the same conditions as described above in (a). The evaporation of moisture changed the humidity of the sample air stream 8%, i.e., from 79% to 87%.

The conditions before passing the bales of rubber over the opening 19 were the same as described above for compensation of an ambient humidity change. Thus, the voltage $V_m$ was 0.

Under the conditions of 4(a) above, the resistances of the thermistors were:

|    | Temperature, °F. | Resistance (Ohms) |
|---|---|---|
| $R_1$ | 80 | 1,891.7 |
| $R_2$ | 80 | 1,891.7 |
| $R_3$ | 75 | 2,072.2 |
| $R_4$ | 75.5 | 2,054.2 |

The signal voltage is:

$$V_m = 1.75\left(.5 - \frac{1891.7 + 2054.2}{1891.7 + 1891.7 + 2072.2 + 2054.2}\right)$$

$V_m = 0.002$ volt.

Under the conditions of 4(b) above, the temperature of $R_4$ is 77° F. and its resistance is 2000 ohms. There are no other changes in temperatures of the remaining resistors, and the signal voltage is:

$$V_m = 1.75\left(.5 - \frac{1891.7 + 2000}{1891.7 + 1891.7 + 2072.2 + 2000}\right)$$

$V_m = 0.008$ volt.

If $V_m$ is measured by a recording potentiometer having a limit alarm switch set at 0.003 volt and a full scale sensitivity of 0.01 volt, the bale having 0.15% moisture in 4(a) above produces a 20% deflection on the recorder but it does not trip the alarm and is not rejected. However, the bale containing 0.6% moisture in 4(b) above results in an 80% deflection on the recorder and thus trips the alarm switch and is rejected. Therefore, when using the apparatus of the invention, it is possible to obtain a signal $V_m$ which varies directly with the moisture content of the bales of rubber. When the signal $V_m$ is measured by means of a recording potentiometer or other suitable means, the moisture content of the bale is indicated and it may be retained or rejected as necessary to meet moisture specifications.

Normally, the moisture content of synthetic rubber is less than 2% and preferably less than 1%. Much smaller maximum moisture limits are usually set in order to produce a quality product, such as 0.2%. At such low moisture contents, it has been impractical heretofore to monitor the moisture content of the individual bales of rubber in an accurate, rapid manner. The present invention makes this possible for the first time.

What is claimed is:

1. A method of comparing a sample gas and a reference gas in which the characteristics compared may vary in both gases comprising the steps of generating an electrical response to the wet and dry bulb temperatures of each gas, compensating for variations in the temperature and relative humidity of the gases due to ambient conditions by including the electrical responses in a common balanceable network, and producing an electrical signal indicative of the relation of the relative humidities of the gases.

2. A method of comparing a sample gas and a reference gas in which the characteristics compared may vary in both gases comprising the steps of forming streams of the sample and reference gases, producing an electrical response to wet and dry bulb temperatures of each of the gases by intimately contacting the sample and reference gas streams with sensing means, compensating for variations in the temperature and relative humidity of the gases due to ambient conditions by including the electrical responses in a common balanceable network, and producing an electrical signal indicative of the relation of the relative humidities of the gases.

3. A method of comparing a sample gas and a reference gas in which the characteristics compared may vary in both gases comprising the steps of forming streams of sample and reference gases, measuring the wet and dry bulb temperatures of the gases by intimately contacting the streams of sample and reference gases with thermistor sensing means, compensating for variations in the temperature and relative humidity of the gases due to ambient conditions with an electrical network having two branches by including the thermistor sensing means responsive to the wet bulb temperature of the sample gas and the dry bulb temperature of the reference gas in one branch and including the thermistor sensing means responsive to the dry bulb temperature of the sample gas and the wet bulb temperature of the reference gas in the remaining branch, and comparing electrical conductivity in the two branches of the electrical network as an indication of the relation of the relative humidities of the gases.

4. A method of monitoring the moisture content of synthetic rubber comprising the steps of withdrawing a sample air stream from the immediate vicinity of the rubber, withdrawing an ambient air stream, generating an electrical response to the wet and dry bulb temperature of each stream, combining the electrical responses in a manner which compensates for variations of the temperature and relative humidity of the ambient stream, producing an electrical signal responsive to the differential of the relative humidities of each stream, and measuring the electrical signal as an indication of the moisture content of the synthetic rubber.

5. A method of monitoring the moisture content of synthetic rubber comprising the steps of generating an electrical response to the wet and dry bulb temperatures of ambient air and air taken from the immediate vicinity of the rubber, combining the electrical responses in a manner which compensates for variations of the temperature and relative humidity of the ambient air stream, producing an electrical signal responsive to the differential of the relative humidities of each stream, and measuring the electrical signal as an indication of the moisture content of the synthetic rubber.

6. A method of monitoring the moisture content of synthetic rubber comprising the steps of withdrawing an air stream from the immediate vicinity of the synthetic rubber, withdrawing an ambient air stream, electrically measuring the wet and dry bulb temperatures of each stream, electrically compensating for variations in the temperature and relative humidity of each stream due to ambient conditions, and measuring the differential in relative humidities of each stream as an indication of the moisture content of the synthetic rubber.

7. A measuring device for comparing a test gas and a reference gas in which the properties compared may vary in both gases comprising thermistors responsive to the wet and dry bulb temperatures of each gas; a bridge network in which a first arm includes the thermistor responsive to the dry bulb temperature of the reference gas and a thermistor responsive to the wet bulb temperature of the test gas, a second arm includes a thermistor responsive to the wet bulb temperature of the reference gas and a thermistor responsive to the dry bulb temperature of the test gas, and third and fourth arms contain predetermined impedances; and an indicator means connected across the bridge network between a juncture of the first and second arms and a juncture of the third and fourth arms, for indicating the relation of the vapor contents of the gases.

8. Moisture content monitoring apparatus including gas supply means supplying ambient atmospheric air and air from the vicinity of a body of synthetic rubber under observation; thermistors responsive to the wet and dry bulb temperatures of each gas; a bridge network in which a first arm includes the thermistor responsive to the dry bulb temperature of the atmospheric air and the thermistor responsive to the wet bulb temperature of the air from the vicinity of the body of synthetic rubber, and a second arm includes the thermistor responsive to the wet bulb temperature of the atmospheric air and the thermistor responsive to the dry bulb temperature of the air from the vicinity of the body of the synthetic rubber, and third and fourth arms include predetermined impedances; and indicator means connected across the bridge network between a juncture of the first and second arms and a juncture of the third and fourth arms, for indicating the relation of the relative humidities of the gases.

9. A measuring device for comparing a test gas and a reference gas in which the characteristics compared may vary in both gases comprising a plurality of sensing means electrically responsive to the wet and dry bulb temperatures of each gas connected in an electrically balanceable network having two branches in which a first branch includes sensing means responsive to the dry bulb temperature of the reference gas and sensing means responsive to the wet bulb temperature of the test gas and a second branch includes sensing means responsive to the wet bulb temperature of the reference gas and sensing means responsive to the dry bulb temperature of the test gas, and meter means connected to measure the electrical-null-balance relationship of the branches of the balanceable network for indicating the relation of the vapor contents of the gases.

10. Monitoring apparatus including supply means supplying ambient gas and gas from the vicinity of a body of synthetic rubber under observation; a balanceable network having two branches in which one branch includes means electrically responsive to the dry bulb temperature of the ambient gas and means electrically responsive to the wet bulb temperature of the gas from the vicinity of the body of synthetic rubber and the second branch of the balanceable network includes means electrically responsive to wet bulb temperature of the ambient gas and means electrically responsive to the dry bulb temperature of the gas from the vicinity of the body of synthetic rubber; and meter means connected to measure the electrical-null-balance relationship of the branches of the balanceable network for monitoring the moisture content of the synthetic rubber.

References Cited in the file of this patent

UNITED STATES PATENTS

| | | |
|---|---|---|
| 1,741,266 | Witham | Dec. 31, 1929 |
| 1,751,179 | Upson | Mar. 18, 1930 |
| 2,501,377 | Cherry | Mar. 21, 1950 |
| 2,528,018 | Stewart | Oct. 31, 1950 |
| 2,593,169 | Moore | Apr. 15, 1952 |
| 2,822,743 | Colvin | Feb. 11, 1958 |
| 2,828,464 | Nixon et al. | Mar. 25, 1958 |
| 2,845,790 | Eddy | Aug. 5, 1958 |